(12) United States Patent
Lehto

(10) Patent No.: US 9,002,789 B2
(45) Date of Patent: Apr. 7, 2015

(54) BACKUP SYSTEM AND METHOD IN A MOBILE TELECOMMUNICATION NETWORK

(75) Inventor: Mariette Lehto, Stockholm (SE)

(73) Assignee: Giesecke & Devrient GmbH, Munich (DE)

( * ) Notice: Subject to any disclaimer, the term of this patent is extended or adjusted under 35 U.S.C. 154(b) by 2006 days.

(21) Appl. No.: 11/720,855

(22) PCT Filed: Dec. 7, 2005

(86) PCT No.: PCT/SE2005/001858
§ 371 (c)(1),
(2), (4) Date: Nov. 25, 2009

(87) PCT Pub. No.: WO2006/062475
PCT Pub. Date: Jun. 15, 2006

(65) Prior Publication Data
US 2010/0063960 A1  Mar. 11, 2010

(30) Foreign Application Priority Data
Dec. 8, 2004 (SE) ........................................ 0402994

(51) Int. Cl.
| | |
|---|---|
| *G06F 17/30* | (2006.01) |
| *H04W 24/04* | (2009.01) |
| *H04W 8/20* | (2009.01) |
| *H04L 29/06* | (2006.01) |

(52) U.S. Cl.
CPC .............. *H04W 24/04* (2013.01); *H04W 8/205* (2013.01); *H04L 69/08* (2013.01)

(58) Field of Classification Search
CPC .......... G06F 17/30194; G06F 11/1456; G06F 15/16; G06F 17/30
USPC .................................. 707/607, 609, 617, 640
See application file for complete search history.

(56) References Cited

U.S. PATENT DOCUMENTS

| | | | |
|---|---|---|---|
| 6,134,316 A * | 10/2000 | Kallioniemi et al. .... | 379/220.01 |
| 6,599,147 B1 * | 7/2003 | Mills et al. .................... | 439/377 |
| 6,671,818 B1 * | 12/2003 | Mikurak ....................... | 714/4.21 |
| 6,829,593 B1 * | 12/2004 | Ritter et al. .................... | 705/51 |
| 2002/0081995 A1 | 6/2002 | Leppinen et al. | |
| 2003/0104801 A1 * | 6/2003 | Koulakiotis et al. .......... | 455/406 |

FOREIGN PATENT DOCUMENTS

| | | |
|---|---|---|
| EP | 1566981 | 8/2005 |
| JP | 2003309669 | 10/2003 |
| WO | 2004/021296 | 9/2007 |

* cited by examiner

*Primary Examiner* — Anteneh Girma
(74) *Attorney, Agent, or Firm* — Fasth Law Offices; Rolf Fasth

(57) ABSTRACT

The backup method is performed in a mobile telecommunication network for transferring data from one mobile station to another. The mobile stations have a terminal part and a subscription part. The method includes the steps of creating a backup file of data from a first mobile station, reading data from a second mobile station to which the data is to be transferred, converting the backup file into a format of the second mobile station, and downloading the resulting backup file of the foregoing step to the second mobile station.

19 Claims, 2 Drawing Sheets

BACKUP SYSTEM AND METHOD IN A MOBILE TELECOMMUNICATION NETWORK

PRIOR APPLICATIONS

Figure 1:
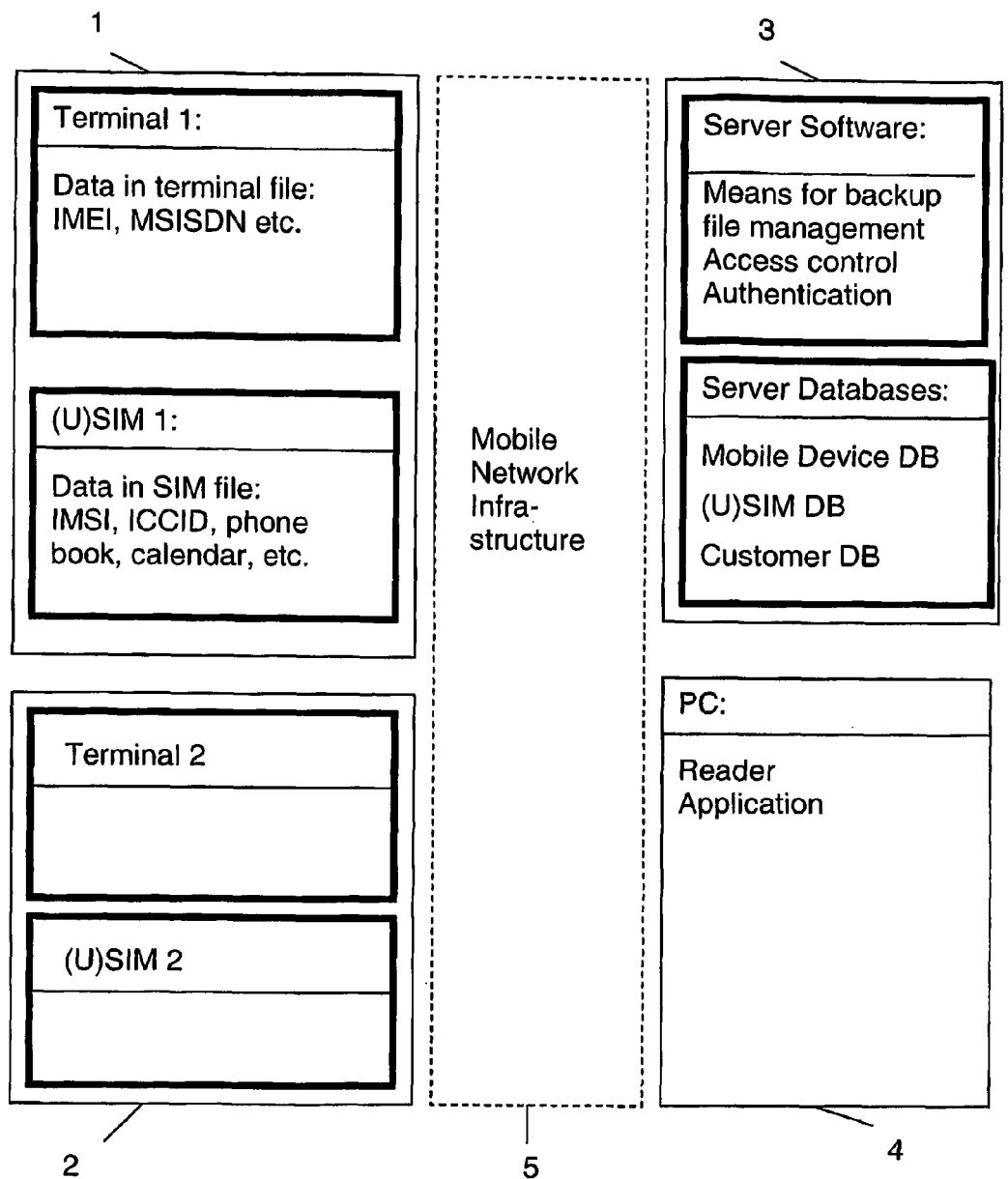

This is a US national phase patent application that claims priority from PCT/SE2005/001858 filed 7 Dec. 2005, that claims priority from Swedish Patent Application No. 0402994-8, filed 8 Dec. 2004.

TECHNICAL FIELD

The invention is concerned with a backup system and method in a mobile telecommunication network including backup solutions to either or both of the SIM card of a mobile phone and the mobile phone itself.

BACKGROUND ART

The Global System for Mobile Communication (GSM) is a standard for digital wireless communications with services, such as voice telephony. GSM, together with other technologies, is part of an evolution including e.g. General Packet Radio System (GPRS), and Universal Mobile Telecommunications Service (UMTS). UMTS is the next ($3^{rd}$) generation mobile communication system, which provides an enhanced range of multimedia services, such as video.

In mobile networks people can be contacted by calling to their mobile telephone number or by sending to that number a so called short message by e.g. making use of the Short Message Service (SMS). The point-to-point Short message service (SMS) provides a way of sending messages of limited size to and from GSM mobiles. Detailed information can be found in the ETSI standard GSM 03.40 Version 5.3.0.

The Subscriber Identity Module (SIM) inside GSM phones was originally designed as a secure way to connect individual subscribers to the network but is nowadays becoming a standardized and secure application platform for GSM and next generation networks.

The SIM card is a smart card that saves subscriber information about identity, subscription, subscription environment, radio environment and other information. The information in the SIM is stored in a logical structure of files, one of which contains the so called "phone book".

UMTS has specified the use of the USIM (universal SIM) as the evolution of SIM. In GSM and UMTS networks, the (U)SIM card is central both for subscriber identification and for providing value added services to users. Usually referred to as a SIM card, the USIM (UMTS Subscriber Identity Module) is the user subscription to the UMTS mobile network. The USIM contains relevant information that enables access onto the subscribed operator's network.

The development of GSM Networks and terminals to support more advanced data bearer technologies has allowed for the introduction of new exciting data services, such as communications, financial management, information retrieval, entertainment and game playing. Therefore the U(SIM) cards have a lot of subscriber specific information stored.

The Mobile Station (MS), also referred to as the "device", represents the only equipment the GSM user ever sees from the whole system. It actually consists of two distinct entities. The actual hardware is the Mobile Equipment (ME), also referred to as the "terminal" or the "handset", which consists of the physical equipment, such as the radio transceiver, display and digital signal processors. The subscriber information is stored in the Subscriber Identity Module (SIM), implemented as a Smart Card.

The mobile equipment is uniquely identified by the International Mobile Equipment Identity (IMEI) being a unique code that corresponds to a specific GSM handset. The SIM card contains the International Mobile Subscriber Identity (IMSI), identifying the subscriber, a secret key for authentication, and other user information.

The IMEI and the IMSI are, however, independent and can thereby provide personal mobility.

The central component of the network subsystem is the mobile services switching center. This acts like a normal switching node of the PSTN (Public Switched Telephone Network) or ISDN (Integrated Services Digital Network) and connects the mobile signal to these fixed networks. It additionally provides all the functionality needed to handle a mobile subscriber, such as registration, authentication, location updating, handovers and call routing to a roaming subscriber. The Mobile Station Integrated Service Digital Network Number, MSISDN, is the standard international telephone number used to identify a given subscriber.

The operator declares the subscription in a database inside the network, which holds the correspondence between the IMSI and the MSISDN. By inserting the SIM card into another GSM terminal, the user is able to receive and make calls from that terminal, and receive other subscribed services.

When a new (U)SIM is issued, a lot of information, both personal and to some extent operator defined, is lost, unless this information is copied from the old (U)SIM to the new (U)SIM. This could for example be the phone book.

Introducing a new terminal has other, problems—since it is not personalized as (U)SIM cards are. Hence it is required to be configured with network settings to be enabled to use the different services the Mobile Service Provider offers. Apart from that, the same problem with personal information and services, as with the (U)SIM Cards, applies.

Some problems arise when an end user wants to change either subscription or terminal or both as data stored in the old terminal and/or old (U)SIM card can get lost.

Some SIM or mobile terminal specific solutions to handle this problem exist, but they do not combine both. For example, due to competitive reasons, mobile terminal suppliers develop products for managing their own terminals, but do not support terminals provided by other vendors.

OBJECT OF THE INVENTION

The object of the invention is to provide a solution for managing backups between mobile stations, and especially a solution that is able to take backups from both the (U)SIM card and the mobile terminal vendor independently.

SUMMARY OF THE INVENTION

The backup method of the invention is performed in a mobile telecommunication network for transferring data from one mobile station to another. The mobile stations comprise a terminal part and a subscription part. The method comprises the steps of creating a backup file of data from a first mobile station, reading data from a second mobile station to which said data is intended to be transferred, converting the backup file into a format of the second mobile station, and downloading the resulting backup file of the foregoing step to the second mobile station.

The invention is also concerned with a system with means for performing the method of the invention.

Preferable embodiments of the invention are presented in the subclaims.

Thus, it might be advantageous to convert the backup system from the format of the first mobile station into a general format before converting it to the format of the mobile station to which the information is to be transferred.

The backup file created from the first mobile station can be created from either the terminal or the subscription identification module of the mobile station or both.

The creation of the backup file reading of data and/or converting of the backup file can be performed by an application in the mobile station or in an external computer or by a server. Thus, the functionalities between the application and server can vary.

The means for creation and/or converting of the backup file is an application in the mobile station or in an external computer or in a server.

The means for converting of the backup file are in connection with one or more databases containing information to be used for the conversion.

The back-up file may include e.g. phonebook, contacts, short messages, multimedia messages, pictures etc.

There are thus several alternative ways to perform the method of the invention, such as different ways of creating the back-up since the back-up file can be initiated by the end-user from the mobile station or it can be initiated by the end-user through a 3$^{rd}$ party via an external client (e.g. a Point of sales client).

If an external client has been used, it is possible to store all back-ups in the client and send the back-up information to the server later on (e.g. run a batch once a day for creating back-ups for several users). It is also possible to perform the steps of the method of the invention in different orders e.g. read the backup data is first read from the mobile station, map the settings are mapped at the client side, download personal information is downloaded to the new mobile station, and not until then the backup file is sent to the server.

The solution of the invention can be implemented so that Information can be sent from the client to the server via any network.

If the back-up action (creation, update or retrieving) is initiated by the end-user (via an application in the mobile station), the service logic can exist either in the mobile station or in the network, or partially in the mobile station and partially at the network side, i.e. intelligence is needed both at the user and the server side, since the mobile station initiates the backup, informs when the backup file should be transferred to the new terminal/SIM, sends the backup information to the server and finally receives the backup file. The server (network), in turn, is responsible of the converting into a general form and of the converting into the form required by the new terminal/SIM, is in contact with different databases, such as the terminal database, (U)SIM database and customer database, stores the data of the customer in the customer database, is responsible of storing the information into the customer database, of authentication and encryption, checking of what information exactly is sent to the user.

The solution of the invention enables backups from both the SIM card and the mobile terminal of the end user's mobile station. The solution is vendor independent i.e. backups can be taken from different SIM cards and different terminals. It can also be used by Point-of-Sales for giving better service for the end-users.

The invention offers the possibility to map settings between different terminals/SIM vendors to allow all kind of backups to be ported between them. The solution can then be a part of a complete device management offering.

Once the back-up has been taken from a mobile station of an end-user and sent to a server, it is possible to update the back-up file and/or retrieve the backup file from the server. The back-up file can be successfully retrieved from the server to the end-user's mobile terminal and/or SIM card as careful converting is a part of the invention. Furthermore, the backup file can be created, updated and retrieved independently of network, i.e. the transmission channel between the mobile station and server can be any mobile or fixed network.

The server or a system attached to the server can provide access control/authentication/security support for ensuring that backup files and possibly end user specific confidential information is correctly handled.

The solution of the invention can be used as a part of the activation process at the point of sales e.g. at activation of a new customer with an "old device", at SWAP (U)SIM and when the mobile terminal and/or (U)SIM is changed.

Other advantages of the invention are that customer data (back-ups) can be collected from PoS clients and that other features such as device configuration can be introduced as a part of the solution.

End-user benefits are that back-up of device/SIM data is always available and that retailers can transfer user's personal data. Thus right object and service settings can be downloaded to the new terminal and/or SIM. The solution of the invention is very convenient (no extra effort for end-user) in that services and personal data are available immediately after buying a new handset, and the end user has an easy start to use new services.

In the following, the invention is described by means of a preferable embodiment by means of a figures. The intention is not to restrict the invention to the details of the following description.

FIGURES

Figure 2:
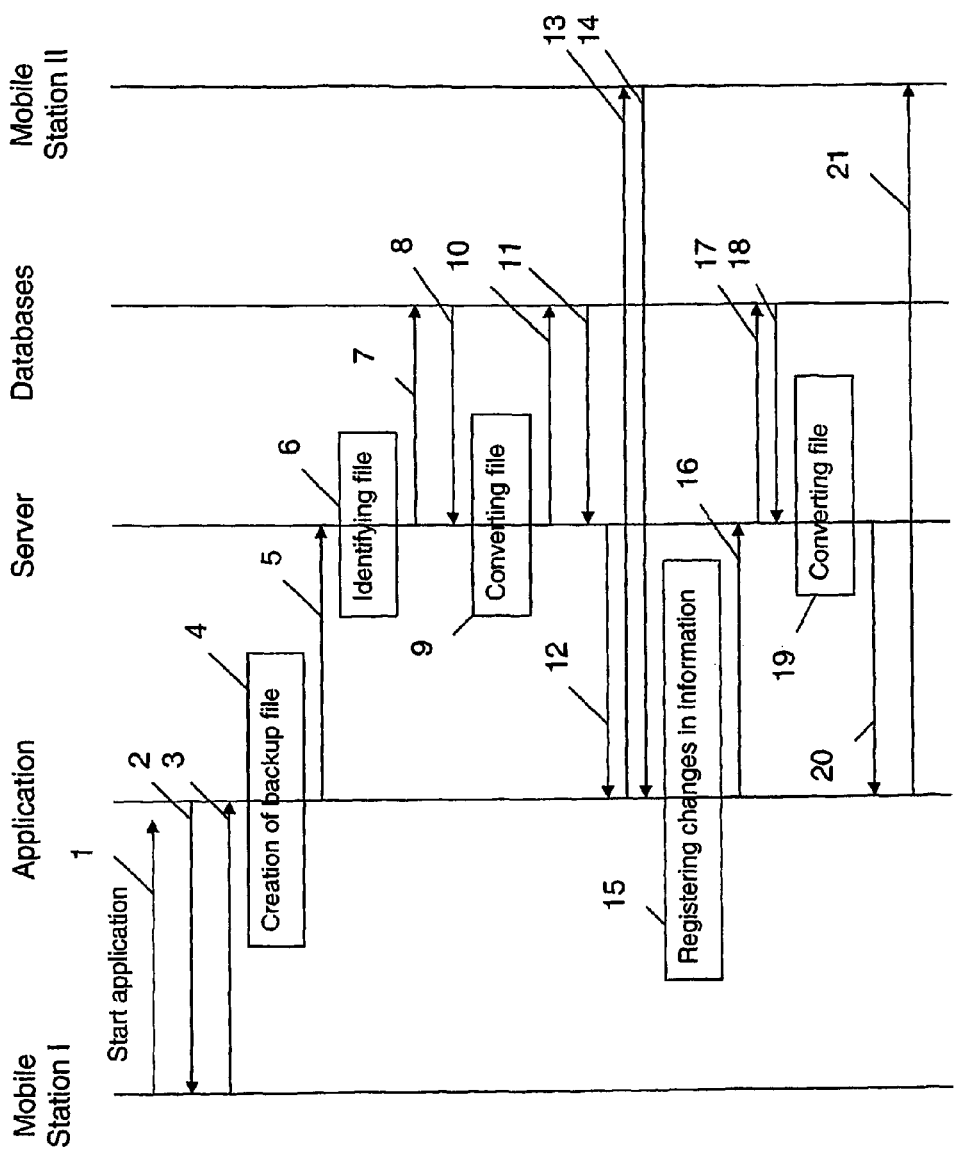

FIG. 1 is an example of an environmental view of a network in which the invention can be implemented FIG. 2 is a signal diagram of an embodiment of the invention, wherein data is transferred from one mobile station to another

DETAILED DESCRIPTION

FIG. 1 is an environmental view of a network in which the invention can be implemented.

FIG. 1 presents a first mobile station with reference number 1, which is the end-user's equipment including a terminal part (terminal 1) and a (U)SIM card ((U)SIM 1) and software for enabling communication with the back-up server and/or a Point-of-Sale (PoS) client having reference number 3 in FIG. 1 and with an application, which in FIG. 1 is in an external computer 4, which can be a point-of-sale client. Such an application might alternatively be situated in the mobile stations 1, 2.

The terminal 1 has a file with stored data such as the, MSISDN (the MSISDN may be stored in the SIM or in the mobile phone) and IMEI, while files in the (U)SIM card stores the IMSI, ICCID and user specific information like phone book information, contact information, calendar information, pictures etc.

FIG. 1 actually presents the situation, wherein the end user has a new mobile station 2 already but wherein the files in the mobile station (both in the terminal 1 and the (U)SIM card 1) are still in the old mobile station 1 but are intended to be transferred to the new mobile station 2, which has not any user specific back-up data stored in the terminal 2 and the (U)SIM yet.

The second mobile station with reference number 2 is the end-user's new equipment including a terminal part (terminal 2) and a (U)SIM card ((U)SIM 2) and software for enabling communication with the back-up server 3 and/or a PoS client when either the end-user's (U)SIM card or the mobile terminal or both have been changed. The second mobile station might also have means to communicate with the backup application.

A Point of Sale (PoS) Client, which e.g. can be any PC client or other computer and have the reference number 4 in FIG. 1, is a part of the inventive solution, has an application, which is capable of reading back-up information from the mobile station 1 (i.e. end-user's mobile terminal+SIM card), modify the file and download the file to the new mobile station 2. The application is also capable of sending the information to the server 3 in the network. The Client 4 can be for example a Point-of-Sales Client.

The Server 3 is another part of the inventive solution, which is capable of storing back-up files, allowing back-ups for new users, storing updated back-up files and sending back-up files to users. The Server 3 or a system attached to the Server 3 includes access control/authentication support for ensuring that user information is correctly treated. It also includes conversion and mapping of the settings between different terminals and SIM cards. The backups are preferably stored in an encrypted form. The server may also have the capability of encrypting or decrypting user data while processing it. An access from client 4 to the server 3 or from the mobile stations 1, 2 to the server 3 might includes network components, gateway(s) and possible other attached systems.

The server uses information fetched from different databases connected to it for converting the backup files into a generic format or into a format by the second mobile station.

The information for converting the file and which database is used depends on the content of the backup file to be converted. The Mobile Device Database gives information for converting the file into a device specific format, The (U)SIM database gives information for converting the file into a (U)SIM specific format and the Customer Database includes customer specific information. The information can be stored in different databases or in the same database.

With respect to the customer data base, it might contain customer specific information about e.g. IMEI, IMSI, ICCID, and MSISDN. Furthermore, it might contain detailed information about names, numbers, addresses etc. stored by the user as well as detailed information about the backup of the customer's SIM card, e.g. a continuation part for the phone book or some other information, such as short messages. This database might also have information connected to encryption, passwords etc. It can further contain an authentication code, security keys, a mobile phone—back-up file: a file type (e.g phone book), a File/Field IDs including personal back-up information (e.g. position, name, number), maximum number of items to be stored or maximum amount of memory, remaining number of items or remaining size of the memory, a SIM card back-up file: an application type/ID (e.g. SIM or USIM), a file type (phone book), a file/field IDs including personal back-up information (e.g. position, name, number), maximum number of items to be stored or maximum amount of memory, remaining number of items or remaining size of the memory, number of stored items or used size of the memory.

The (U)SIM database can e.g. contain the following information:
- the IMSI (or a list of IMSIs)
- the ICCID (or a list of ICCIDs incl. the connection between IMSI and ICCID)
- the MSISDN (or a list of MSISDNs incl. its connection to IMSI)
- the Card Profile (used for defining which ICCIDs/IMSIs belong to which profile. A profile defines how to handle each card type, such as protocols etc)
- an application type(s)/ID(s) e.g. SIM/USIM (may be required if there are multiple applications in the same card)
- File type e.g. phone book
- Location of each specific 'file type' on the SIM (may vary depending on the card profile) e.g. file location in the directory or any other way of identifying the location
  - Master directory
  - Directory file
  - A (elementary) file
- The data structure associated to each file type (this may vary depending on card type)
  - Position (where each item is/can be stored)
  - Maximum number of items to be stored in this specific file in this specific application on the card OR the maximum amount of memory in this specific file in this specific application on the card.
  - File/Field ID; defines field types, e.g. name, number, address, e-mail
  - File/Field ID status; available or not available (describes which kind of information can be stored in this specific card). For example SIM card may not include possibility to store e-mail address into the phone book.
  - Maximum size of each file/field
  - Field order (in which order the information is stored e.g. name, number, e-mail or name, e-mail, number)
- Protocol 1 (defines how to read the file when it comes from the client and how to change it to a generic format. This depends on the card type. This is used when receiving the back-up file from the client)
- Protocol 2 (defines how to format the generic file into a card specific format. This is used when sending the back-up file to SIM).
- Business rules specifying combinations that are not possible. E.g. when it is not possible to copy data from USIM to SIM.

The Mobile Device Database can e.g. contain the following information:
- the IMEI (or a list of IMEIs)
- the MSISDN (or a list of MSISDNs incl. connection to IMEI)
- IMEI profile (defines how to handle different mobile phones. E.g. the location of the back-up data might depend on the application or file type, maximum amount of data to be stored, protocols etc)
- the File type (e.g. phone book)
- Location of each specific 'file type' on the mobile phone (may vary depending on the case) e.g. location in the directory or any other way of identifying the location
  - Master directory
  - Directory file
  - A (elementary) file
- the data structure associated to each file type (this varies depending on the mobile phone type and version)

Position (where each item is stored)

Maximum number of items to be stored in this specific file in this specific application on the mobile phone OR max amount of memory in this specific file in this specific application on the mobile phone Field ID; defines field types e.g. name, number, address, e-mail Field ID status (describes which kind of data can be stored in this handset)

Maximum size of each field per field ID

Field order (in which order is the information stored e.g. name, number, e-mail or name, e-mail, number)

Protocol A (defines how to read the file when it comes from the client and how to change it to a generic format. This depends on the mobile phone. This is used when receiving the back-up file from the client)

Protocol B (defines how to format the generic file into a mobile phone specific format. This is used when sending the back-up file to the mobile phone).

Business rules specifying combinations that are not possible or any other special cases.

A file/field can be left empty if the user has not stored info to a specific file/field or the SIM/mobile phone does not support that specific file/field, e.g. the address. If there is not enough memory in the receiving mobile phone or SIM card, it is possible to cut the amount of data to be sent. And possibly, if e.g. the SIM memory is full, to send the remaining part to the mobile phone instead.

If the file/field size is too small in the receiving mobile phone or SIM card, it is possible to cut the information to be fitted to the receiving SIM or mobile phone. E.g. if the address is too long it can be shortened etc. This also includes details about the back-up from the mobile phone.

In this context, the Mobile Network Infrastructure 5 includes all components and functions needed for mobile data communication, both in GSM, UMTS and internet. There could possibly be other networks as well like W-LAN and 4th generation mobile networks. The mobile stations 1, 2, in turn include both a terminal (Terminal 1 respective Terminal 2) and a (U)SIM card ((U)SIM 1 respective (U)SIM 2. Thus, the mobile stations 1, 2 both have access to the mobile network infrastructure 5.

FIG. 1 is an example of a practical solution and one skilled in the art can easily use other solutions within the scope of the invention.

There might be different reasons for transferring data from one mobile station to another. One is that an end user intends to keep his old terminal but change to a new subscription and therefore a new SIM card is to be put in the terminal. Alternatively, the end user might change terminal but keep the old subscription and therefore inserts his SIM card into the new terminal. The end user might even change both terminal and SIM card but still wishes to save the data from both the terminal and SIM and transfer it to the new mobile station combination.

FIG. 2 is a signal diagram of an embodiment of the invention, wherein data is transferred from one mobile station to another.

The following steps are performed to transfer data from the old mobile station to the new one.

The old mobile station (corresponds to mobile station 1 in FIG. 1 and from which data is intended to be transferred to another mobile station) is first connected to a "reader" in a back-up client (corresponds to reference number 4, FIG. 1), which e.g. can be any PC client or other computer, having an application for reading back-up information from the mobile station 1. The backup application program in the PC 4 is in this example of FIG. 2 thus an external computer but it can also be in the user's mobile station. If the back-up program is in the user's mobile device, then the physical connection is not required.

In the method of the invention, the backup application program is first started by the user terminal with signal 1 of FIG. 2. The back-up program can also be started from the PC application.

In signals 2 and 3, the application then reads respective gets the data from the files from both the terminal and (U)SIM card of the user's mobile station in order to constitute a backup file. The backup file might include data such as the IMSI, MSISDN, IMEI, ICCID and user specific information like phone book information, contact information, pictures etc. When the files have been read, the user's mobile station is disconnected from the reader.

The application then creates a backup file in step 4. The backup file consists of both the content of the backup itself as well as information of it in form of a description of the file. The file also includes information required for identifying the user e.g. MSISDN/IMSI. It also includes IMEI/ICCID for identifying the mobile phone and SIM card.

The content of the backup file can e.g. include personal user information, such as phone book data, short messages, pictures (taken by the user) etc. The content can also consist of software saved by the user itself, such as games. Furthermore, the backup can be concerned with settings downloaded by the operator to the user (e.g. phone settings) or other functionalities, such as roaming lists.

The description of the backup file created can contain different information about the backup file, such as the backup source (i.e. the mobile device or the SIM card), a backup or file identification (ID), which identifies what information the backup Is concerned with; an own code can e.g. be defined for each kind of feature, e.g. the phone book, the short messages, the pictures, the menu, USIM settings etc. Furthermore it can contain an application ID, such as to inform if the application is a 2nd generation SIM application or $3^{rd}$ generation USIM application or other and also information about the file size.

The content of the backup information can thus e.g. have the appearance: IMSI/ICCID/Application ID(SIM)/File type (e.g. phonebook)/content of phone book (positions+names+numbers)/Size of file (i.e. size of phone book)

This backup file with describing information is sent further to a server in signal 5. The server now has to convert and store this data in a general form so that it would be in a suitable format to be converted and sent to terminals with different settings.

When the backup file arrives to the server, the server identifies in step 6 what part of the file contains the SIM backup, what part the device backup and other content of the backup file.

The server uses information fetched from the different databases in signals 7 and 8 for converting the backup files into a generic format.

The server has to check how data from these particular SIM and terminal is read. In FIG. 2, the different databases are called with a common expression "databases". The information for converting the file and which database is needed depends on the content of the backup file to be converted. The Mobile Device Database gives information for converting the file into a device specific format, The (U)SIM database gives information for converting the file into a (U)SIM specific format and the Customer Database includes customer specific information.

The server performs the conversion to a general format on the basis of the backup information in step 9. For e.g. a SIM/USIM conversion to be made, the following steps are carried out.

When the server has identified in step 6 what part of the file(s) contains the SIM backup. The server then checks the IMSI and/or ICCID and reads from the (U)SIM database in steps 7 and 8, how this particular SIM card should be handled (i.e. the protocol that defines what is characteristic for this particular card, for example in which form the data is stored. Different SIM card manufactures may e.g. use different protocols and formats for storing data on the SIM.

Thereafter, the server reads the file type/ID from the backup message of step 5, the file type/ID telling what information the backup file contains. The ID can e.g be an identifier for the phone book. The next information in the backup message is the content, in this case the content of the phone book (the names and the numbers). The server checks how the phone book is stored on this particular card (e.g. in which format). The server then stores the phone book in a general format, in a place in the database reserved for "content of phone book". Or alternatively each item of the file type (phone book) is stored as an own file in the DB. If specific information is not available, e.g. the fax-number, the file or field in the DB is left empty.

Corresponding steps are performed for the device backup file.

When the server has identified in step 6 what part of the file(s) contains the terminal backup, the server checks the IMEI and reads from the Mobile Device database in steps 7 and 8, how this particular terminal should be handled (i.e. the protocol that defines what is characteristic for this particular terminal, for example in which form the data is stored. Different device manufactures e.g. use different protocols and formats for storing data on the terminal.

Thereafter, the server reads the file type/ID from the backup message of step 5, the file type/ID telling what information the backup file contains. The ID can e.g be an identifier for the phone book. The next information in the backup message is the content, in this case the content of the phone book (the names and the numbers). The server checks how the phone book is stored on this particular terminal (e.g. in which format). The server then stores the phone book in a general format in steps 10 and 11, in a place in the right database(s) reserved for "content of phone book".

The data in different terminal models and SIM cards might vary. For example in its simplest form, the phone book contains only a name and a telephone number, but in some embodiments also other information might be included such as e-mails, faxes and addresses. Also the order of the information can vary, e.g. the name and the number might be in a different order, like the other information as well. Furthermore, the size of the information fields can be different. In some applications, the maximum length of specific field/file could be 14 characters, in other applications even 20 characters. Further differences might be the way and place of storing the data and the memory size.

With respect to the customer data base, it might contain customer specific information about e.g. IMEI, IMSI, ICCID, and MSISDN. Furthermore, it might contain detailed information about names, numbers, addresses etc. stored by the user as well as detailed information about the backup of the customer's SIM card, e.g. a continuation part for the phone book or some other information, such as short messages. This database might also have information connected to encryption, passwords etc.

Thereafter, the server sends, in signal 12, an acknowledgement confirmation to the application about a successful backup storage.

Thus, backup has now been taken from the first mobile station (both the device and the SIM card).

Next, the user takes the new mobile station in use and connects it to the reader of the client, the application now being able to communicate with the new mobile station combination, which might consist of the old terminal but a new SIM card, a new terminal but the old SIM card or both a new terminal and a new SIM card.

There are different ways to connect the new mobile station to the backup application. This applies in both cases: when reading the data from the mobile station 1 or when downloading information to mobile station 2.

The application might e.g. be in a separate PC or other computer and the mobile station can be connected through a cable and the SIM is connected with an other cable to this computer via a card reader (in this case there are two physical connections). The mobile station can also be connected to the computer with a cable, the SIM being inside, in which there is only one physical connection and the data is downloaded to the SIM via the mobile device. A third alternative is that the mobile device is connected to the computer via a local radio link, such as a Bluetooth connection, the SIM being inside. Also in this case the data is downloaded to the SIM via the device. A still further alternative is that the mobile device is connected to the computer via the mobile network, the SIM being inside. In this case the function to transfer the backup file to the new mobile station is selected from the software by the user. As there is no direct connection between the mobile station and the computer, the user has to inform some additional information as well, such as MSISDN, IMEI, ICCID, so that the computer would know which mobile station it communicates with.

The transfer is in all cases initiated by the user e.g. so that the users selects a function from the application, which starts the transfer of the backup to the new mobile station.

In signals 13 and 14, the application reads and gets connectivity information from the new mobile station, i.e. the IMEI, IMSI, MSISDN and ICCID by means of which the type of the new mobile station is identified (type of mobile terminal and SIM card).

In step 15, the application notes changes in the connectivity information, and based on these changes, the right backup file (the backup file of a certain IMEI, IMSI, MSISDN and/or ICCID) is requested from the server in signal 16. If the application notes that IMEI is changed, the terminal backup file is requested. If again IMSI or ICCID are changed, the SIM backup file is requested. If both IMEI and IMSI/ICCID are changed both the terminal and the SIM backup files are requested. If the SIM card has been changed and there is not enough memory in the new card, it is possible to cut the file and send the first part only.

As a result of signal 16, the server checks in steps 17 and 18 how this particular SIM card (if it is question about a SIM backup file) or this particular device (if it is question about a terminal backup file) should be handled, e.g the protocol that defines what is characteristic for this particular card or device, for example in which form the data is stored and to which location the data should be stored. The server then converts the backup file into a format used by this particular SIM card or device in step 19.

In step 20, the server sends the converted backup file to the application and the converted backup file is downloaded to the new mobile station combination in step 21.

Also FIG. 2 is only one example of a practical solution and one skilled in the art can easily use other solutions within the scope of the invention.

It is e.g. not necessary to convert the backup file created from the first mobile station into a general format as it also can be directly converted to the format of the second mobile station. In that case, steps 7-9 can be omitted.

An other possibility is that the creation of the back up file only is made from the terminal or the SIM card, in which case the application already either is only designed for one alternative or it already knows in this stage which backup it is question about. Consequently, it is the that backup file, which in converted form is downloaded to the second mobile terminal or SIM. The user e.g. only connects the SIM card to the application, which means that the mobile phone is not available. Or the user enters the information in the application level 'send mobile phone back-up only'.

In a further alternative, additional memory can be inserted on the phone (or in some other device, such as a PC). A backup can then, in addition from the terminal or SIM, also be taken from a memory or smart card.

Also the functionalities between the application and server can vary freely, e.g. the application can be in contact with the databases and perform the conversion or it can perform the conversion when it knows which file to backup, then it can request the server to download a certain backup file.

One skilled in the art is able to do some modifications to get the method to work in the best way. It might e.g. be practical or sometimes even necessary to split up the backup file when sending it from one entity to another, e.g. when the application sends the backup file to the server. Correspondingly, when the server sends the backup file to the phone/SIM, it might send the SIM message and the file to be sent to the phone separately and even split up the messages.

While the present invention has been described in accordance with preferred compositions and embodiments, it is to be understood that certain substitutions and alterations may be made thereto without departing from the spirit and scope of the following claims.

The invention claimed is:

1. A backup method in a mobile telecommunication network for transferring data from one mobile phone to another, comprising:
   providing a first mobile phone having a terminal part and a subscription identification module (SIM);
   reading data from the first mobile phone;
   using the data read from the first mobile phone for creating a backup file;
   reading connectivity information from a second mobile phone to which the backup file is to be transferred, the second mobile phone having a terminal part and a subscription identification module (SIM);
   using the connectivity information to identify a type of the second mobile phone with respect to type of the terminal part and the SIM disposed in the second mobile phone;
   converting the backup file into a format of the second mobile phone based on the connectivity information; and
   downloading the converted backup file to the second mobile phone.

2. The method of claim 1 wherein the step of creating further comprises converting a backup system from a format of the first mobile phone into a general format.

3. The method of claim 1 wherein the step of creating further comprises creating the backup file from the terminal part and/or the subscription identification module.

4. The method of claim 1 wherein the method further comprises creating the backup file by an application in the first mobile phone or in an external computer.

5. The method of claim 4 wherein the method further comprises performing the steps of reading data and/or converting the backup file are performed by an application or in a separate server.

6. The method of claim 5 wherein the method further comprises performing the step of converting the backup file by means of data from one or more databases in connection with the application or the separate server.

7. The method of claim 1 wherein the method further comprises including information related to IMSI, MSISDN, IMEI, ICCID phone book information, contact information, pictures, short messages, games, functionalities, settings and software in the backup file.

8. A backup system in a mobile telecommunication network, comprising:
   a first mobile phone and a second mobile phone between which data is transferred, the mobile phones comprising a terminal part and a subscription identification module;
   means for reading data from the first mobile phone;
   means for using the data read from the first mobile phone for creating a backup file;
   means for using the connectivity information to identify a type of the second mobile phone with respect to type of the terminal part and the SIM disposed in the second mobile phone;
   means for reading connectivity information from the second mobile phone;
   means for converting the backup file into a format of the second mobile phone based on the connectivity information; and
   means for sending the converted backup file to the second mobile phone.

9. The backup system of claim 8 wherein the means for creating and/or the means for converting the backup file is an application in one of the mobile phones or in an external computer.

10. The backup system of claim 8 wherein the means for creating and/or converting the backup file is in a server.

11. The backup system of claim 8 wherein the means for converting the backup file is connected to one or more databases containing information to be used for the conversion.

12. The backup system of claim 8 wherein the mobile telecommunication network is GSM or UMTS, whereby the subscription identification module is SIM or (U) SIM.

13. The backup system of claim 11 wherein one database is a Mobile Device Database containing information for converting the backup file into a device specific format.

14. The backup system of claim 13 wherein the Mobile Device Database contains information about IMEI, MSISDN, a connection between MSISDN and IMEI, an application ID, a data structure in each application, information about how to read a file and how to change a format and business rules of the file.

15. The backup system of claim 11 wherein one database is a (U)SIM database containing information for converting the file into a (U)SIM specific format.

16. The backup system of claim 15 wherein the (U)SIM database contains information including IMSI, ICCID, a connection between IMSI and ICCID, MSISDN, a connection between MSISDN and IMSI, a card profile, an application ID, a file ID, a data structure type in each file, information about how to read the backup file and how to change a format and business rules of the backup file.

17. The backup system of claim 11 wherein one database is a Customer Database containing customer specific information about IMEI, IMSI, ICCID, and MSISDN.

18. The backup system of claim 11 wherein the backup file contains information related to IMSI, MSISDN, IMEI, ICCID and phone book information, contact information, pictures, short messages, games, functionalities, settings and software.

19. A backup method in a mobile telecommunication network for transferring data from one mobile phone to another, comprising:
   providing a first mobile phone and a second mobile phone each having a terminal part and a subscription identification module (SIM) ;
   reading data from the first mobile phone;
   using the data read from the first mobile phone for creating a backup file;
   reading data from the second mobile phone to which the data is to be transferred;
   using the data from the second mobile phone to identify a type of the second mobile phone with respect to type of the terminal part and the SIM disposed in the second mobile phone;
   converting the backup file into a format of the second mobile phone based on the data; and
   downloading the converted backup file to the second mobile phone.

\* \* \* \* \*